United States Patent [19]

Ammons

[11] 4,131,606
[45] Dec. 26, 1978

[54] POLY(LACTONE)URETHANE CURABLE AT [CASTABLE] AMBIENT TEMPERATURE [CURABLE POLYURETHANE INTERLAYER] USING BUTYLSTANNOIC ACID CATALYST

[75] Inventor: Vernon G. Ammons, Glenshaw, Pa.

[73] Assignee: PPG Industries, Inc., Pittsburgh, Pa.

[21] Appl. No.: 866,438

[22] Filed: Jan. 3, 1978

[51] Int. Cl.² .............................................. C08G 18/24
[52] U.S. Cl. ........................................ 528/58; 528/81;
428/424; 428/412; 428/425
[58] Field of Search ................. 260/77.5 AB, 2.5 AB,
260/75 NB, 77.5 AN; 428/425

[56] References Cited
U.S. PATENT DOCUMENTS

| 3,060,137 | 10/1962 | Gemeinhandt et al. | 260/2.5 AB |
|---|---|---|---|
| 3,194,770 | 7/1965 | Hostettler | 260/77.5 AB |
| 3,194,773 | 7/1965 | Hostettler | 260/77.5 AB |
| 3,509,015 | 4/1970 | Wismer et al. | 260/77.5 AM |
| 3,620,905 | 11/1971 | Ahramjian | 260/77.5 AM |
| 3,764,457 | 10/1973 | Chang et al. | 260/77.5 AP |
| 3,900,446 | 8/1975 | McClung et al. | 260/77.5 AT |
| 3,900,655 | 8/1975 | Wolgemuth et al. | 428/214 |
| 3,931,113 | 1/1976 | Seeger et al. | 260/77.5 AM |
| 4,024,113 | 5/1977 | Ammons | 260/77.5 AM |
| 4,035,548 | 7/1977 | Chang et al. | 260/77.5 AN |

*Primary Examiner*—M. J. Welsh
*Attorney, Agent, or Firm*—Donna L. Seidel

[57] ABSTRACT

A homogeneous, colorless liquid reaction mixture of a polycaprolactone polyol, a cycloaliphatic diisocyanate and butyl stannoic acid catalyst is cast and cured at ambient or slightly elevated temperatures to form a transparent, elastomeric polyurethane.

12 Claims, No Drawings

POLY(LACTONE)URETHANE CURABLE AT [CASTABLE] AMBIENT TEMPERATURE [CURABLE POLYURETHANE INTERLAYER] USING BUTYLSTANNOIC ACID CATALYST

BACKGROUND OF THE INVENTION

1. Field of the Invention

The present invention relates generally to polyurethane compositions and more particularly to polyurethane reaction mixtures which can be cast and cured at ambient or slightly elevated temperatures.

2. The Prior Art

A long standing problem in the fabrication of glass-plastic laminates is warpage, due to differences in coefficients of thermal expansion, resulting from high temperatures during fabrication. This problem is overcome by the present invention which provides a polyurethane composition amenable to fabrication at ambient or slightly elevated temperatures.

SUMMARY OF THE INVENTION

The present invention relates to a transparent thermoplastic polyurethane composition prepared from a colorless liquid reaction mixture of a polylactone polyol, a cycloaliphatic diisocyanate and butyl stannoic acid catalyst. The reaction mixture has a relatively long pot life at room temperature and a sufficiently low viscosity that the mixture can be cast by gravity feed alone. The reaction mixture cures to a readily handleable, though not fully cured, stage in about 24 hours at room temperature. The polyurethane may be fully cured at ambient or slightly elevated temperatures. The fully cured polyurethane is colorless, transparent, tough and elastomeric.

According to the present invention, a polylactone polyol is mixed with a substantially equivalent amount of a cycloaliphatic diisocyanate. The resultant liquid reaction mixture, containing butyl stannoic acid catalyst, is cast into a sheet mold. In about 24 hours at room temperature, the reaction mixture is sufficiently cured to be handleable in sheet form but still capable of some degree of flow at elevated temperatures. The polyurethane may be completely cured in place at slightly elevated temperature or even at ambient temperature over a period ranging upward from about 6 days at 130° F. (about 54° C.). Alternatively, a sheet of partially cured polyurethane may be laminated with glass by autoclave techniques. During a typical autoclave cycle, the polyurethane is completely cured.

DETAILED DESCRIPTION OF THE PREFERRED EMBODIMENT

An aliphatic polyurethane curable at ambient or slightly elevated temperature is prepared from a reaction mixture of substantially equivalent proportions of an aliphatic organic diisocyanate and a polylactone polyol using butyl stannoic acid as a catalyst.

The diisocyanate is preferably a cycloaliphatic diisocyanate such as 4,4'-methylene-bis-(cyclohexyl isocyanate) which is a liquid at ambient temperature. Polyurethanes prepared from aliphatic diisocyanates, particularly cycloaliphatic diisocyanates, have high impact resistance over a wide temperature range and are not adversely affected by ultraviolet light. In addition to the most preferred diisocyanate, 4,4'-methylene-bis-(cyclohexyl isocyanate) having 55 percent trans and 45 percent cis isocyanato groups, other preferred aliphatic diisocyanates include 1,4-cyclohexyl diisocyanate; 4,4'-isopropylidene-bis-(cyclohexyl isocyanate) and other dinuclear cycloaliphatic diisocyanates formed through an alkylidene bridging group of from 1 to 3 carbon atoms which can be ring substituted with nitro, chloro, alkyl, alkoxy and other groups.

Polylactone polyols useful according to the present invention preferably have a molecular weight between about 300 and about 1000 and either are liquid at room temperature or melt at slightly above room temperature and remain liquified in the reaction mixture at room temperature. A preferred polylactone polyol is a polycaprolactone triol which may be made by ring opening epsilon-caprolactone with trimethylolpropane. The polycaprolactone triol preferably has a molecular weight of about 900 to 1,000. Other preferred polylactone polyols are mixtures of a polycaprolactone diol with a polycaprolactone triol. In these mixtures, the molecular weights of both the diol and the triol are preferably in the range of about 300 to 1,000. In all cases, sufficient triol is used to provide the polyurethane with a molecular weight between branch points of about 900 to 4,000.

The reaction mixture further includes a catalyst for the urethane polymerization, butyl stannoic acid. This catalyst provides the reaction mixture with a long pot life at room temperature but at the same time promotes full cure of the polymer without exposure to high temperatures. In general, catalysts which provide long pot life require high temperatures for full cure while catalysts which provide full cure at ambient temperatures result in very short pot life. The butyl stannoic acid catalyst of the present invention is preferably incorporated in the reaction mixture as a dilute solution in a polylactone diol, preferably about a 1 percent solution in a polycaprolactone diol of molecular weight about 950 to 1050. The catalyst concentration in the reaction mixture is sufficient to provide a substantially complete cure and is generally in the range of about 500 to 1000 parts per million.

The polylactone polyol, diisocyanate and catalyst are mixed together to yield a transparent, homogeneous liquid at ambient temperature, of sufficiently low viscosity that casting into a sheet mold is possible by gravity feed alone at ambient temperature. The liquid reaction mixture, which remains castable for about 2 hours, is cast into a sheet mold preferably comprising sheets of glass and/or plastic. The cast material sets to any easy to handle, but not fully cured, state in about 24 hours at ambient temperature, typically 70 to 75° F. (about 21 to 24° C.).

In a preferred embodiment of the present invention, the reaction mixture is cast between a glass sheet and a rigid transparent plastic sheet such as polycarbonate. The polyurethane cures in place to form an energy-absorbing interlayer, typically 40 to 100 mils (about 1 to 2.5 millimeters) thick between the two rigid sheets in a laminated product.

The present invention will be more fully understood from the description of specific examples which follow.

EXAMPLE I

The following components are mixed together to yield a colorless, transparent, homogeneous, low-viscosity liquid reaction mixture at ambient temperature and pressure:

| Component | Equivalents | Weight % |
| --- | --- | --- |
| 4,4'-methylene-bis-(cyclohexyl isocyanate) | 1.000 | 30.00 |
| polycaprolactone triol | 0.940 | 63.10 |
| butyl stannoic acid catalyst solution | 0.060 | 6.90 |

The isocyanate component is commercially available as Hylene W from duPont. The polycaprolactone triol of this example has a molecular weight of about 900 and is available as PCP-0310 from Union Carbide. The catalyst solution is 1 percent by weight butyl stannoic acid dissolved in a polycaprolactone diol of molecular weight about 1000. The resultant catalyst level is 690 parts per million. The liquid reaction mixture is cast into a sheet mold between a glass sheet and a rigid polycarbonate sheet in parallel facing relationship at a spacing of about 40 mils (about 1 millimeter). After 24 hours at room temperature, the glass/polyurethane/polycarbonate composite has enough integrity to withstand further processing. The polyurethane interlayer is fully cured in about 14 days at a temperature of about 110 to 120° F. (about 43 to 49° C.), a temperature low enough to minimize warpage of the composite. The finished product is useful as an aircraft transparency.

EXAMPLE II

The following reaction mixture is prepared, cast and cured in place as in Example I:

| Component | Equivalents | Weight % |
| --- | --- | --- |
| 4,4'-methylene-bis-(cyclohexyl isocyanate) | 1.000 | 30.72 |
| polycaprolactone triol | 0.500 | 34.63 |
| polycaprolactone diol | 0.440 | 27.55 |
| butyl stannoic acid catalyst solution | 0.060 | 7.10 |

The polycaprolactone diol has a molecular weight of about 530 and is available from Union Carbide as PCP-0200. The other components are as described in Example I.

EXAMPLE III

The following reaction mixture is prepared, cast and cured in place as in the previous examples:

| Component | Equivalents | Weight % |
| --- | --- | --- |
| 4,4'-methylene-bis-(cyclohexyl isocyanate) | 1.000 | 31.24 |
| polycaprolactone triol | 0.250 | 17.60 |
| polycaprolactone diol | 0.690 | 43.93 |
| butyl stannoic acid catalyst solution | 0.060 | 7.23 |

EXAMPLE IV

The following reaction mixture is prepared, cast and cured as in the previous examples:

| Component | Equivalents | Weight % |
| --- | --- | --- |
| 4,4'-methylene-bis-(cyclohexyl isocyanate) | 1.000 | 34.90 |
| polycaprolactone triol | 0.216 | 5.90 |
| polycaprolactone diol | 0.730 | 51.93 |
| butyl stannoic acid catalyst solution | 0.054 | 7.27 |

However, in this example, the polycaprolactone triol has a molecular weight of about 300 and is available from Union Carbide as PCP-0301.

EXAMPLE V

The following reaction mixture is prepared, cast and cured as in the previous examples using the components described in Example IV:

| Component | Equivalents | Weight % |
| --- | --- | --- |
| 4,4'-methylene-bis-(cyclohexyl isocyanate) | 1.000 | 38.19 |
| polycaprolactone triol | 0.400 | 11.95 |
| polycaprolactone diol | 0.550 | 42.50 |
| butyl stannoic acid catalyst | 0.050 | 7.36 |

The polyurethanes of the above examples have urethane contents ranging from about 13.0 to about 17.5 percent and molecular weights between branch points from about 900 to about 4,000. Catalyst concentrations range from about 690 to about 740 parts per million. The most preferred polyurethanes of the present invention appear to be those with a urethane content between about 14 and 16 percent and a molecular weight between branch points of about 3000 to 3400. These polymers typically have a tensile strength of about 3000 to 4000 pounds per square inch and an elongation of about 300 percent.

The above examples are offered only to illustrate the present invention which is not limited to this embodiment. Variations and modifications are included within the spirit of the invention. For example, adhesion control agents may be included in the polymer formulation as disclosed in U.S. Pat. Nos. 3,791,914 and 3,900,686 which disclosures are incorporated herein by reference. Multiple laminates wherein the energy absorbing polymeric layer is exposed may be formed by casting the polymeric formulation of the present invention between sheets, one of which is coated on the surface against which the polymer is cast with a material from which the polymer will release. This sheet is removed after the polymer is at least partially cured. The scope of the present invention is defined by the following claims.

I claim:

1. A polyurethane composition curable at ambient temperatures prepared by the reaction of:
   a. an aliphatic diisocyanate;
   b. a polylactone polyol comprising polylactone triol; and
   c. butyl stannoic acid catalyst.

2. The polyurethane composition according to claim 1, wherein the aliphatic diisocyanate is a cycloaliphatic diisocyanate.

3. The polyurethane composition according to claim 2, wherein the cycloaliphatic diisocyanate is 4,4'-methylene-bis-(cyclohexyl isocyanate).

4. The polyurethane composition according to claim 1, wherein the polylactone polyol consists essentially of polycaprolactone triol having a molecular weight between about 900 and 1000.

5. The polyurethane composition according to claim 1, wherein the polylactone polyol is a mixture of polylactone triol having a molcular weight between 300 and 1000 and polylactone diol having a molecular weight between about 300 and about 1000.

6. The polyurethane composition according to claim 1, wherein the polylactone polyol is a polycaprolactone polyol.

7. A method for making a composite sheet structure which comprises a polyurethane interlayer curable at ambient temperatures comprising the steps of:

a. casting into a sheet mold a liquid reaction mixture which comprises:
   (1) an aliphatic diisocyanate;
   (2) a polylactone polyol comprising polylactone triol;
   (3) butyl stannoic acid catalyst; and
b. curing the reaction mixture in place at a temperature sufficiently low that substantially no warpage of the composite occurs.

8. The method according to claim 7, wherein the aliphatic diisocyanate is 4,4'-methylene-bis-(cyclohexyl isocyanate).

9. The method according to claim 8, wherein the polylactone polyol consists essentially of polycaprolactone triol having a molecular weight between about 900 and 1000.

10. The method according to claim 8, wherein the polylactone polyol is a mixture of polycaprolactone triol having a molecular weight between about 300 and 1000 and polycaprolactone diol having a molecular weight between about 300 and 1000.

11. The method according to claim 9, wherein the reaction mixture is cured at a temperature no higher than about 130° F. for at least about 6 days.

12. The method according to claim 11, wherein the reaction mixture is cured at a temperature between about 110 and about 120° F. for about 2 weeks.

* * * * *

UNITED STATES PATENT AND TRADEMARK OFFICE
CERTIFICATE OF CORRECTION

PATENT NO. : 4,131,606
DATED : December 26, 1978
INVENTOR(S) : Vernon G. Ammons

It is certified that error appears in the above—identified patent and that said Letters Patent are hereby corrected as shown below:

The title reads POLY(LACTONE)URETHANE CURABLE AT [CASTABLE] AMBIENT TEMPERATURE [CURABLE POLYURETHANE INTERLAYER] USING BUTYLSTANNOIC ACID CATALYST, it should read
POLY(LACTONE) URETHANE CURABLE AT AMBIENT TEMPERATURE USING BUTYLSTANNOIC ACID CATALYST.

Signed and Sealed this

First Day of May 1979

[SEAL]

Attest:

RUTH C. MASON
Attesting Officer

DONALD W. BANNER
Commissioner of Patents and Trademarks